US012427877B2

(12) United States Patent
Eitler et al.

(10) Patent No.: US 12,427,877 B2
(45) Date of Patent: Sep. 30, 2025

(54) METHOD AND APPARATUS FOR SMOOTHED SUPPLY CURRENT OF HIGH-VOLTAGE CONSUMERS ON THE HIGH-VOLTAGE INTERMEDIATE CIRCUIT OF THE CHARGING DEVICE

(71) Applicant: Dr. Ing. h.c. F. Porsche Aktiengesellschaft, Stuttgart (DE)

(72) Inventors: Moritz Eitler, Stuttgart (DE); Eric Mueller, Leinfelden-Echterdingen (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 86 days.

(21) Appl. No.: 18/124,131

(22) Filed: Mar. 21, 2023

(65) Prior Publication Data

US 2023/0339356 A1    Oct. 26, 2023

(30) Foreign Application Priority Data

Apr. 26, 2022  (DE) ...................... 10 2022 110 039.1

(51) Int. Cl.
  *B60L 53/22*  (2019.01)
  *B60L 1/02*  (2006.01)
  (Continued)

(52) U.S. Cl.
  CPC .............. *B60L 53/22* (2019.02); *B60L 1/02* (2013.01); *H02J 7/345* (2013.01); *B60L 2210/10* (2013.01); *H02J 7/00711* (2020.01)

(58) Field of Classification Search
  None
  See application file for complete search history.

(56) References Cited

U.S. PATENT DOCUMENTS 11,283,433 B2   3/2022  Leinsle et al.
11,451,071 B2   9/2022  Dai et al.
(Continued)

FOREIGN PATENT DOCUMENTS

CN       112789192        5/2021
DE    102016007088 B3 *  6/2017  ............... B60L 1/00

OTHER PUBLICATIONS

English machine translation of DE102016007088B3 published Jun. 22, 2017 (Year: 2017).*

(Continued)

*Primary Examiner* — Rexford N Barnie
*Assistant Examiner* — David A Shiao
(74) *Attorney, Agent, or Firm* — Gerald E. Hespos; Michael J. Porco

(57) ABSTRACT

A method provides a supply current (303) for high-voltage consumers (114), in which a battery-electric vehicle has a charging power unit with a high-voltage intermediate circuit (110) for charging a high-voltage battery (102). The high-voltage intermediate circuit (110) includes a high-capacitance charging device (106), at least one bi-directional power output stage (112*a*, 112*b*) having a connection to the high-voltage battery (102), and at least one high-voltage consumer (114). The high-voltage intermediate circuit (110) has a high intermediate circuit capacitance at least through the charging device (106). The bi-directional power output stage (112, 112*b*) is actuated with a pulse width modulation, and, through the at least one bi-directional power output stage (112*a*, 112*b*), a supply current (303) is provided from the high-voltage battery (102) to the high-voltage consumer (114) via the high-voltage intermediate circuit (110). The supply current (303) is smoothed due to the high intermediate circuit capacitance.

8 Claims, 1 Drawing Sheet

(51) Int. Cl.
*H02J 7/34* (2006.01)
*H02J 7/00* (2006.01)

(56) References Cited

U.S. PATENT DOCUMENTS

| | | | | |
|---|---|---|---|---|
| 2009/0021221 | A1* | 1/2009 | Krauer | B60L 1/08 |
| | | | | 320/153 |
| 2009/0315518 | A1* | 12/2009 | Soma | B60L 8/00 |
| | | | | 320/134 |
| 2013/0116889 | A1* | 5/2013 | Zhang | H02J 7/1438 |
| | | | | 320/109 |
| 2018/0351374 | A1* | 12/2018 | Liu | H02J 7/00 |
| 2020/0091753 | A1* | 3/2020 | Maruyama | H02M 7/217 |
| 2020/0207209 | A1* | 7/2020 | Engel | H02J 7/0068 |
| 2021/0031641 | A1* | 2/2021 | Pfizenmaier | B60L 1/02 |
| 2022/0103003 | A1* | 3/2022 | Sahoo | H02J 1/02 |

OTHER PUBLICATIONS

"DC-DC Output Smoothing Using Ultra-High CV Aluminum Electrolytic Capacitors", published Nov. 15, 2020 (Year: 2020).*
"Looking closer at smoothing capacitors in electric vehicles", published Oct. 16, 2024 (Year: 2024).*
"What is a smoothing Capacitor", published Apr. 15, 2012. (Year: 2012).*

* cited by examiner

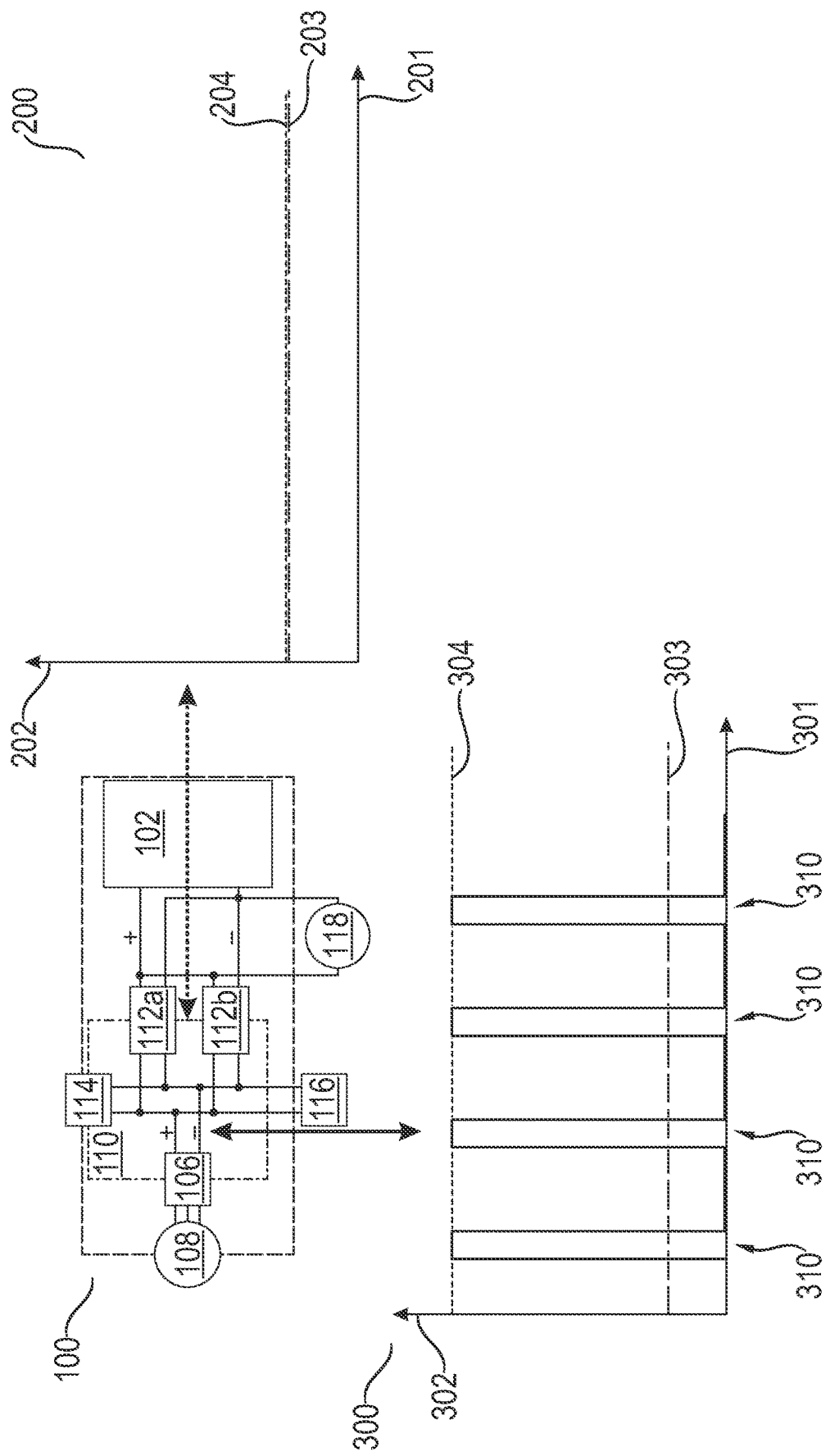

METHOD AND APPARATUS FOR SMOOTHED SUPPLY CURRENT OF HIGH-VOLTAGE CONSUMERS ON THE HIGH-VOLTAGE INTERMEDIATE CIRCUIT OF THE CHARGING DEVICE

CROSS REFERENCE TO RELATED APPLICATION

This application claims priority on German Patent Application No. 10 2022 110 039.1 filed Apr. 26, 2022, the entire disclosure of which is incorporated herein by reference.

BACKGROUND

Field of the Invention: The invention relates to a method for providing a smoothed supply current for high-voltage consumers on an intermediate circuit in a charging power unit.

Related Art "PTC" is an abbreviation for "Positive Temperature Coefficient." PTC heating elements now are used commonly for interior heating in electric vehicles and are arranged simply in an air flow before an outlet opening. The PTC heating elements automatically limit excessive heating with an increase of the electrical resistance along with the temperature of the PTC heating element.

U.S. Pat. No. 11,283,433 B2 relates to a pulse width modulation, abbreviated as "PWM," and controls power of consumers on a high-voltage network of a vehicle. Each consumer, including for example a heating element, is controlled via an individual control circuit.

However, according to the prior art, low-frequency PTC clocked heaters that run in the range of a few 100 Hz cause rectangular current profiles. Such low frequencies cannot be attenuated meaningfully by simple capacitances, as this would require capacitances of several hundred millifarads, which would be associated with large and costly capacitors. If filtering is not done, however, the rectangular current would have to be carried directly by a utility, such as a high-voltage battery. A peak current must be provided for the PTC heater to prevent the high-voltage battery from exceeding technical limits. However, a ratio of this peak current to be provided for the medium current actually consumed by a real heating power can be very large, in particular in PWM-controlled heaters, in a low-load range.

If, for example, 1 KW average heating power over pulse width modulation is set at 20 kW peak power with a clock ratio of 1/20, 19 KW battery power ultimately remains unused due to the necessary provision of the 20 kW peak power and also cannot be provided to other consumers. If a high-voltage battery has a power release of e.g., 50 kW at a given operating point, then only 30 kW power would be available to a drive to be also supplied. This problem is exacerbated by a turn-on current value that is very high in PWM-controlled PTC heaters due to a low resistance Rmin at low turn-on temperature according to the PTC characteristic. In addition, further dynamic high-voltage consumers have similar problems, such as in the case of electrical chassis for short dynamic loads, e.g., due to potholes, where a higher power than the power called up by the means also must be provided.

U.S. Pat. No. 11,451,071 B2 discloses a vehicle network that has a DC voltage transformer and a high-voltage bus connected to a common circuit. The DC voltage converter lowers voltage from a high-voltage battery for a low voltage grid with a PTC heating element, the high-voltage bus supplies power to a drive motor and a high-voltage heating element.

CN 112 789 192 A discloses a heating element as a high-voltage consumer. The heating element is connected to the high-voltage battery of an electric vehicle via a high-voltage intermediate circuit. A DC voltage converter is arranged between the high-voltage intermediate circuit and the high-voltage battery.

In light of this, an object of the present invention is to provide a method for actuating high-voltage consumers connected to a high-voltage intermediate circuit, where power is provided from a high-voltage battery. A high-power reservoir is to be avoided. An apparatus on which the method can be implemented also is provided.

SUMMARY OF THE INVENTION

This disclosure relates to a method for providing a supply current for high-voltage consumers in a battery-electric vehicle and for charging a high-voltage battery of the battery-electric vehicle. The vehicle comprises a charging power unit having a high-voltage intermediate circuit. The high-voltage intermediate circuit, comprises a charging device having a high capacitance, at least one bi-directional power output stage with a connection to the high-voltage battery, and at least one high-voltage consumer. The high-voltage intermediate circuit thus has a high intermediate circuit capacitance at least through the charging device. The at least one bi-directional power output stage is driven by a pulse width modulation. Through the at least one bi-directional power output stage, a supply current is provided from the high-voltage battery to the at least one high-voltage consumer via the high-voltage intermediate circuit. Thus, the supply current is greatly smoothed due to the high intermediate circuit capacitance.

The method according to the invention advantageously utilizes the high intermediate circuit capacitance of the high-voltage intermediate circuit to capacitively charge a power from current pulses of the pulse width modulation and to deliver it back to the high-voltage intermediate circuit between the respective current pulses, thereby smoothing the current profile of the supply current of the at least one high-voltage consumer on the high-voltage intermediate circuit.

The actuation by pulse width modulation regulates the power of the at least one high-voltage consumer. With the method of the invention, a peak power given by a level of the current pulses, which defines the power requirement in the prior art, is no longer relevant for a power supply of the high-voltage battery. In the prior art, an average power supplied by the high-voltage battery to the at least one high-voltage consumer results from the peak power and a clock ratio of the pulse width modulation and corresponds to a real consumption demand. However, with the method according to the invention, the average power supplied by the high-voltage battery to the at least one high-voltage consumer advantageously constitutes at the same time the power that is not available to the other consumers in the high-voltage battery.

In one embodiment, the at least one high-voltage consumer is selected from: PTC heater, high-voltage heater, DC-DC converter, adaptive chassis control, and vehicle cooling device. A high-voltage heater is formed, for example, by a high-voltage air heater or a high-voltage water heater.

In a further embodiment, the at least one bi-directional power output stage is formed by a high-capacitance intermediate circuit converter.

In yet another embodiment, the charging device is configured to be connected to a power grid at a mains frequency of 50 Hz or 60 Hz for charging the high-voltage battery. For this purpose, the charging device has a high capacitance in the range of a few millifarads. At least due to this high capacitance value, the high intermediate circuit capacitance is formed. However, depending on the design, the at least one power output stage can also have high capacitance values, which then additionally contribute to the high intermediate circuit capacitance.

In a further embodiment, a power supply of the high-voltage battery for the at least one high-voltage consumer is reduced to a remaining fluctuation range of the smoothed supply current. Thus, the performance is no longer restricted in any operating point of the high-voltage battery, and the otherwise required power requirements advantageously are released, for example, to be available for a traction system. Because a vehicle range in a cold range, e.g., when driving in the morning, is determined from an available power, it increases significantly, especially under cold ambient conditions. Also advantageously, a ripple load in the entire system decreases, which is otherwise caused by the high current pulses of the pulse width modulation.

The invention also relates to an apparatus for providing a supply current for high-voltage consumers. The apparatus comprises a high-voltage battery and a charging power unit having a high-voltage intermediate circuit. The high-voltage intermediate circuit comprises a high-capacitance charging device, at least one bi-directional power output stage connected to the high-voltage battery with a controller, and at least one high-voltage consumer. The controller is configured to provide the at least one high-voltage consumer with a supply current from the high-voltage battery via the high-voltage intermediate circuit by means of a pulse width modulation of the at least one bi-directional power output stage. The supply current is smoothed greatly due to the high intermediate circuit capacitance.

In one embodiment of the apparatus, the at least one high-voltage consumer is selected from: PTC heater, high-voltage heater, DC-DC converter, adaptive chassis control, and vehicle cooling device. The high-voltage heater can be, for example, a high-voltage air heater or a high-voltage water heater.

In a further embodiment, the at least one bi-directional power output stage is formed by a high-capacitance intermediate circuit converter.

In yet another embodiment, the charging device is configured to be connected to a power grid at a mains frequency of 50 Hz or 60 Hz for charging the high-voltage battery. For this purpose, the charging device has a high capacitance in the range of a few millifarads.

In a further embodiment of the apparatus, a power supply of the high-voltage battery for the at least one high-voltage consumer is reduced to a remaining fluctuation range of the smoothed supply current.

Additional advantages and configurations of the invention result from the description and the enclosed drawing.

It goes without saying that the aforementioned features and the features yet to be explained in the following can be used not only in the respectively specified combination, but also in other combinations or on their own, without leaving the scope of the present invention.

BRIEF DESCRIPTION OF THE DRAWINGS

FIG. 1 is a schematic circuit and respective current profiles in one embodiment of the method according to the invention.

DETAILED DESCRIPTION

FIG. 1 schematically depicts a circuit of a high-voltage on-board network 100 and respective current profiles 200, 300 are shown in one embodiment of the method according to the invention. The elements shown schematically in the FIG. 1 may be implemented in various forms of hardware, software or combinations thereof. It will be appreciated by those skilled in the art that the diagram presented in FIG. 1 represents conceptual views of illustrative components embodying the principles of the disclosure. These elements may be implemented in a combination of hardware and software. The hardware may comprise one or more appropriately programmed general-purpose devices that may include a processor, memory and input/output interfaces.

The high-voltage on-board network 100 includes a high-voltage intermediate circuit 110, a high-voltage battery 102, and a power grid connection 108 arranged, for example, for three AC phases. The high-voltage on-board power system 100, in a battery-electric vehicle, is connected to a drive motor as a load 118. Also by way of example, a DC voltage converter 116 is connected to the high-voltage on-board network 100, for example, to lower a high voltage of the high-voltage intermediate circuit 110 to a low-voltage supply network (12 V). The connected high-voltage intermediate circuit 110 comprises a charging device 106 having a high capacitance in the range of a few millifarads, two bi-directional DC voltage converters 112a, 112b, and a high-voltage consumer 114, for example a high-voltage heater. The high capacitance of the charging device 106 is defined originally by a charging function, i.e., from a need to smooth out a 50 Hz mains frequency to charge the high-voltage battery 102. High-voltage consumers 114, such as a PTC heater, also are controlled at very similar frequencies, which are between 50 to 200 Hz. Thus, according to the invention, a smoothing function of the high-voltage intermediate circuit 110, which originally is provided for charging the high-voltage battery 102, is used to supply power to the high-voltage consumer 114. The two bi-directional DC voltage converters 112a, 112b also have high capacitances, so that the high-voltage intermediate circuit 110, as a whole, has a high capacitance in the range of a few millifarads. A graphical view 200 of a battery load current 202 flowing from the high-voltage battery 102 to power the high-voltage consumer 114 along a time axis 201 shows that a maximum outflowing current $I_{max}$ 204 is only slightly above an outflowing current $I_{mean}$ 203 averaged over time. In the graphical view 300 of an intermediate circuit current 302 along a time axis 301, it can be seen that current pulses provided by a control according to a pulse width modulation with a current value $I_{heater,max}$ 304 in their "on" times 310 are smoothed by the high intermediate circuit capacitance to an average supply current $I_{mean}$ 303. When the high-voltage consumer 116 is power-controlled by means of pulse width modulation, the high capacitance of the high-voltage intermediate circuit 110 is able to reduce a ratio $I_{mean}/I_{heater,max}$, which, as indicated in the graphical view 300, can have a factor of, for example, 10, to a ratio $I_{mean}/I_{max}$ in the range of one with a battery load current 202 outflowing from the high-voltage battery 102. This advantageously eliminates the need for power reservoirs in the high-voltage battery 102, and an overall output of the entire high-voltage battery 102 provides additional consumers, minus the supply output of the high-voltage consumer 114.

The invention claimed is:

1. A method for providing a supply current (303) for high-voltage consumers (114) in a battery-electric vehicle that comprises a charging power unit having a high-voltage intermediate circuit (110) for charging a high-voltage battery (102), the high-voltage intermediate circuit (110) including a charging device (106) having a high-capacitance, at least one bi-directional power output stage (112a, 112b) coupled to the charging device (106) and having a connection to the high-voltage battery (102), and at least one high-voltage consumer (114) coupled to the at least one bi-directional power output stage (112a, 112b), the high-voltage intermediate circuit (110) having a high intermediate circuit capacitance at least through the charging device (106), the at least one bi-directional power output stage (112, 112b) is actuated with a pulse width modulation, wherein, through the at least one bi-directional power output stage (112a, 112b), a supply current (303) is provided from the high-voltage battery (102) to the at least one high-voltage consumer (114) via the high-voltage intermediate circuit (110), wherein the high intermediate circuit capacitance of the high-voltage intermediate circuit (110) capacitively charges a power from current pulses of the pulse width modulation and delivers the power back to the high-voltage intermediate circuit (110) between the respective current pulses to supply the required current (310) of the at least one high-voltage consumer (114) while smoothing and reducing the supply current (303) from the high-voltage battery (102) on the high-voltage intermediate circuit (110) below a maximum current (304) for the at least one high-voltage consumer (114) eliminating a power reservoir for the high-voltage battery (102).

2. The method of claim 1, wherein the at least one high-voltage consumer (114) is selected from the group consisting of: PTC heater, high-voltage heater, DC-DC converter, adaptive chassis control, and vehicle cooling device.

3. The method of claim 1, wherein the at least one bi-directional power output stage (112, 112b) is formed by a high-capacitance DC-DC converter.

4. The method of claim 1, wherein the charging device (106) is configured to be connected to a power grid at a mains frequency of 50 Hz or 60 Hz for charging the high-voltage battery (102).

5. An apparatus for providing a supply current (303) for high-voltage consumers (114), the apparatus comprising a high-voltage battery (102) and a charging power unit having a high-voltage intermediate circuit (110), the high-voltage intermediate circuit (110) comprising a high-capacitance charging device (106), at least one bi-directional power output stage (112a, 112b) coupled to the charging device (106) and connected to the high-voltage battery (102) with a controller, and at least one high-voltage consumer (114) coupled to the at least one bi-directional power output stage (112a, 112b), the high-voltage intermediate circuit (110) having a high intermediate circuit capacitance at least through the charging device (106), the controller being configured to provide the at least one high-voltage consumer (114) with a supply current (303) from the high-voltage battery (102) via the high-voltage intermediate circuit (110) by pulse width modulation of the at least one bi-directional power output stage (112a, 112b), wherein the high intermediate circuit capacitance of the high-voltage intermediate circuit (110) capacitively charges a power from current pulses of the pulse width modulation and delivers the power back to the high-voltage intermediate circuit (110) between the respective current pulses to supply the required current (310) of the at least one high-voltage consumer (114) while smoothing and reducing the supply current (303) from the high-voltage battery (102) on the high-voltage intermediate circuit (110) below a maximum current (304) for the at least one high-voltage consumer (114) eliminating a power reservoir for the high-voltage battery (102).

6. The apparatus of claim 5, wherein the at least one high-voltage consumer (114) is selected from the group consisting of: PTC heater, high-voltage heater, DC-DC converter, adaptive chassis control, vehicle cooling device.

7. The apparatus of claim 5, wherein the at least one bi-directional power output stage (112a, 112b) is formed by a high-capacitance DC-DC converter.

8. The apparatus of claim 5, wherein the charging device (106) is configured to be connected to a power grid at a mains frequency of 50 Hz or 60 Hz for charging the high-voltage battery (102).

* * * * *